(12) United States Patent
Chua

(10) Patent No.: US 6,331,141 B1
(45) Date of Patent: Dec. 18, 2001

(54) FLUID EXTRACTION APPARATUS

(76) Inventor: Boon Pen Chua, BLK 341 Hougana Ave 7 #12-459 S(530341), Singapore (SG)

( * ) Notice: Subject to any disclaimer, the term of this patent is extended or adjusted under 35 U.S.C. 154(b) by 0 days.

(21) Appl. No.: 09/147,412

(22) PCT Filed: Jun. 19, 1997

(86) PCT No.: PCT/SG97/00028

§ 371 Date: Dec. 18, 1998

§ 102(e) Date: Dec. 18, 1998

(87) PCT Pub. No.: WO97/48475

PCT Pub. Date: Dec. 24, 1997

(30) Foreign Application Priority Data

Jun. 20, 1996 (SG) .................................. 9610112

(51) Int. Cl.$^7$ .................................................. F24F 7/007
(52) U.S. Cl. ................................................ 454/344
(58) Field of Search ............................... 454/49, 67, 344; 137/888

(56) References Cited

U.S. PATENT DOCUMENTS

| | | | |
|---|---|---|---|
| 116,049 | * 6/1871 | Gouge | 454/344 |
| 499,210 | * 6/1893 | Canavan | 454/344 |
| 1,267,808 | * 5/1918 | Self | 454/344 |
| 1,326,420 | * 12/1919 | Pickens | 454/344 |
| 1,473,648 | * 11/1923 | Scherer | 454/344 |
| 1,767,869 | * 6/1930 | Baumgarten | 454/344 |
| 2,510,395 | * 1/1950 | Goodrie | 137/888 |
| 2,539,344 | * 1/1951 | Carraway | 454/344 |
| 2,573,290 | * 10/1951 | Guilder | 454/344 |
| 2,583,374 | * 1/1952 | Hoffman | 454/344 |
| 3,443,505 | * 5/1969 | Kaufman, Jr. | 454/344 |
| 4,185,466 | 1/1980 | Muntz . | |
| 4,373,897 | 2/1983 | Torborg . | |
| 4,379,897 | 4/1983 | Asano et al. . | |
| 4,457,043 | 7/1984 | Oeberg et al. . | |
| 4,484,563 | * 11/1984 | Fritz et al. | 126/299 |

(List continued on next page.)

FOREIGN PATENT DOCUMENTS

| | | |
|---|---|---|
| 3622744 | 1/1988 | (DE) . |
| 0060345 | 9/1982 | (EP) . |
| 0294006 | 12/1988 | (EP) . |
| 0567956 | 11/1993 | (EP) . |
| 1566302 | 4/1980 | (GB) . |
| 81/01362 | 5/1981 | (WO) . |

OTHER PUBLICATIONS

An English Language abstract of DE 36 22 744.

*Primary Examiner*—Denise L. Ferensic
*Assistant Examiner*—Derek S. Boles
(74) *Attorney, Agent, or Firm*—Greenblum & Bernstein, P.L.C.

(57) ABSTRACT

A fluid extraction apparatus comprises a passage 20 for the pumped flow therealong of a first fluid, for example air. A fluid flow area control device in the form of an apertured plug 22 is present in the passage. An inlet 26 to the passage 20 is provided at or downstream of the downstream side of the plug 22. When, in use, the first fluid is pumped along the passage through the aperture 23 of the plug 22 the fluid pressure at the inlet 26 is reduced causing a second fluid to be drawn into the passage 20 via the inlet 26 to flow with the first fluid towards the downstream end of the passage 20. The downstream end of the passage may be provided with a filter 6 in the form of a tank 8 containing an oil dissolving agent 10. The apparatus has a particular application to a cooker hood assembly for extracting a gas from a cooker hood 2, without having to pass the gas through a pump 4, and then treating the extracted gas to remove pollutants such as water, oil droplets and smoke therefrom.

27 Claims, 4 Drawing Sheets

U.S. PATENT DOCUMENTS

| | | | | |
|---|---|---|---|---|
| 4,702,153 | * | 10/1987 | Grabow | 454/344 |
| 4,721,126 | * | 1/1988 | Horii | 137/888 |
| 4,825,848 | * | 5/1989 | Macias | 126/299 D |
| 4,896,657 | | 1/1990 | Glassman . | |
| 5,159,958 | * | 11/1992 | Samd | 137/888 |
| 5,222,529 | * | 6/1993 | Zoltan | 137/888 |
| 5,253,677 | * | 10/1993 | Sand | 137/888 |
| 5,263,477 | | 11/1993 | Crome . | |
| 5,282,770 | * | 2/1994 | Shibata | 454/239 |
| 5,518,446 | | 5/1996 | Jacob . | |

* cited by examiner

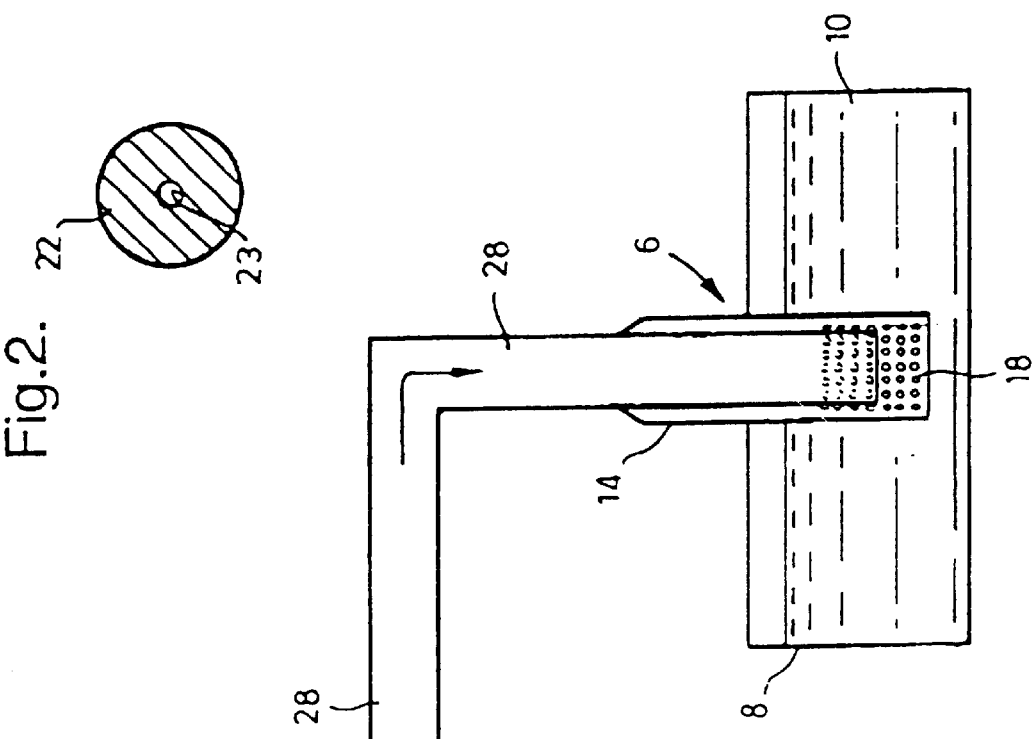
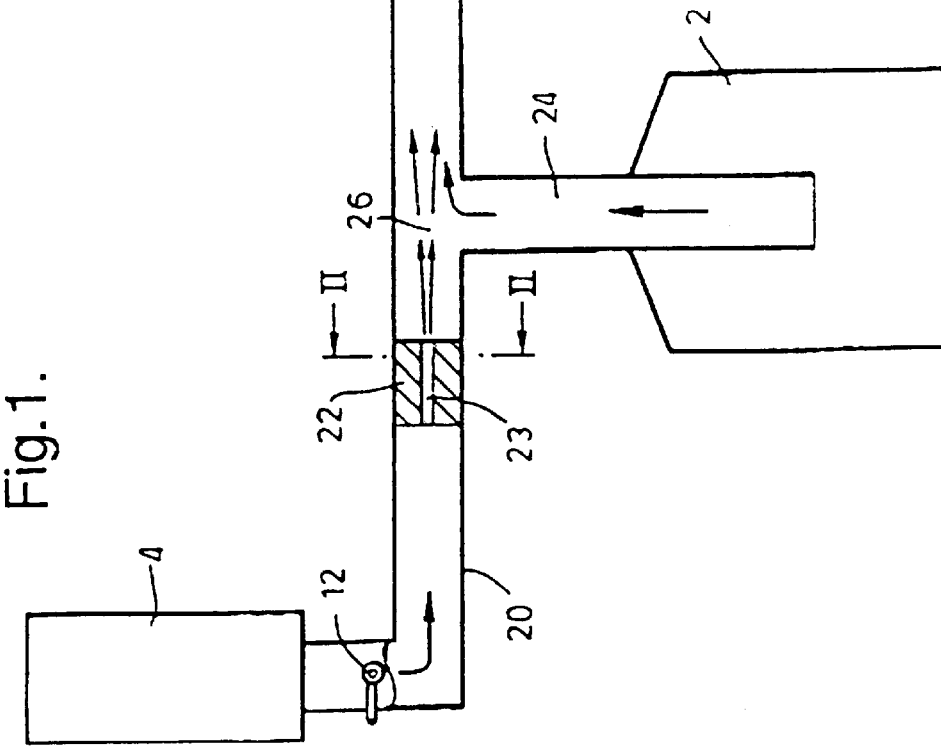

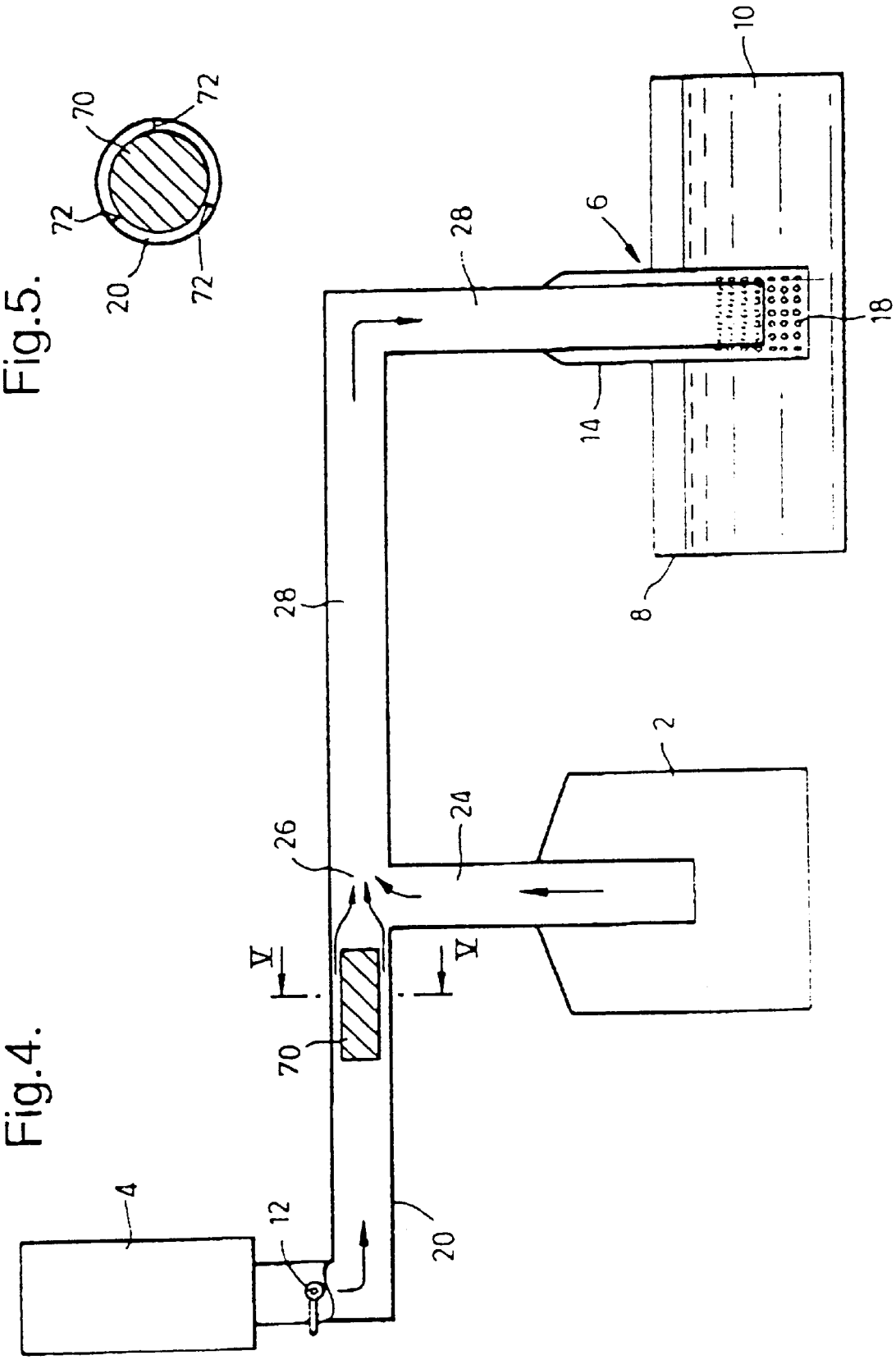
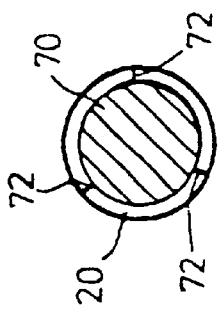
Fig.4.
Fig.5.

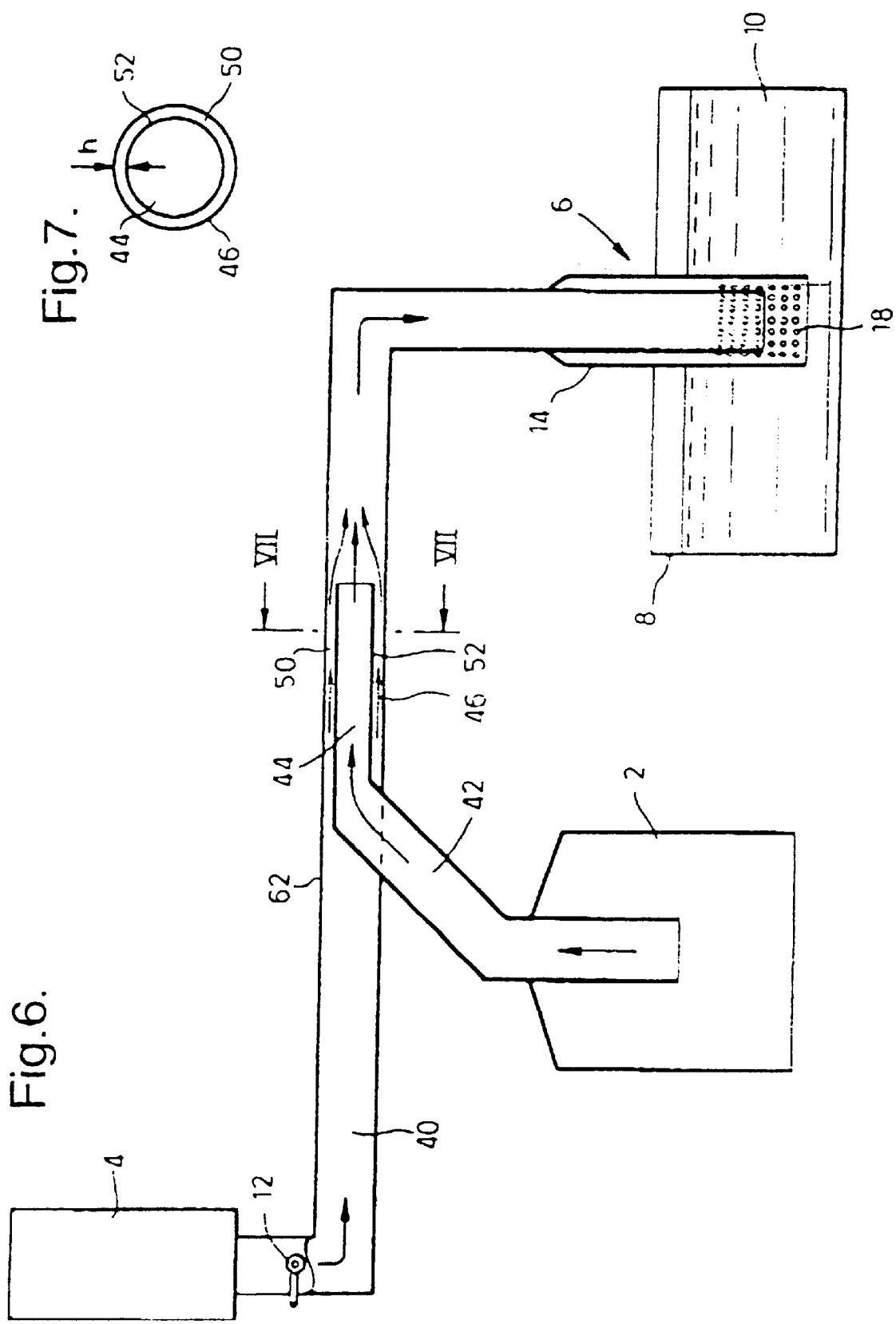

FLUID EXTRACTION APPARATUS

The present invention relates to fluid extraction apparatus, particularly, but not exclusively, to apparatus for use in the pacification, purification or expulsion of a fluid, for example drawing a gas or liquid from a first area and transporting it to a second area at which it may optionally be treated. The present invention has particular application, but is not restricted, to use in the extraction and filtering of air containing impurities such as smoke, water vapour or oil vapour. Such an apparatus can be particularly useful in a cooking environment and could be employed in connection with a cooker hood above a cooking apparatus.

Normal extractor fans or cooker hoods generally use some form of fan in the path of the air to be extracted. Even if the fan is positioned downstream of a filter, oily impurities in the air can become deposited on the fan.

According to the present invention there is provided fluid extraction apparatus comprising:

a passage having an upstream end, a downstream end and a cross-sectional flow area for the pumped flow therealong of a first fluid in a downstream direction;

a fluid flow area control device having an upstream side and a downstream side and providing at said downstream side an increase in the available cross-sectional flow area of said passage between said upstream and downstream ends; and an inlet to said passage at or downstream of said downstream side of said device;

whereby pumped flow of the first fluid along said passage past said device reduces the fluid pressure at said inlet to cause a second fluid to be drawn into said passage via said inlet to flow with the first fluid towards said downstream end.

Said fluid flow area control device advantageously provides an abrupt increase in the available cross-sectional first fluid flow area of said passage at its downstream side.

In a preferred arrangement the passage downstream of the fluid flow area control device is contained within a first conduit and a second conduit, for the supply of the second fluid to the inlet, branches into the first conduit at a branch junction.

The fluid flow area control device may take the form of a plug situated in the first conduit, with the passage passing though at least one aperture provided in the plug. The device may further comprise a hollow extension pipe extending downstream from the downstream side of the plug, beyond the branch junction, with the passage passing through the plug's aperture and through the pipe.

In an alternative arrangement a downstream portion of the second conduit extends into the first conduit, beyond the branch junction, and extends in the downstream direction. The exterior surface of the downstream portion of the second conduit can be spaced from the surrounding interior surface of the first conduit to form therebetween an annular space through which the passage passes. In this way the downstream portion of the second conduit forms the fluid flow area control device.

The present invention will now be described, by way of example only, with reference to the accompanying drawings, in which:

FIG. 1 is a schematic sectional side view of apparatus according to a first embodiment of the present invention;

FIG. 2 is a cross-section along the line II—II in FIG. 1;

FIG. 4 is a schematic sectional side view of apparatus according to a third embodiment of the present invention;

FIG. 5 is a cross-section along line V—V in FIG. 4;

FIG. 6 is a schematic sectional side view of apparatus according to a fourth embodiment of the invention; and FIG. 7 is a cross-sectional view along the line VII—VII in FIG. 6.

Figure 3:
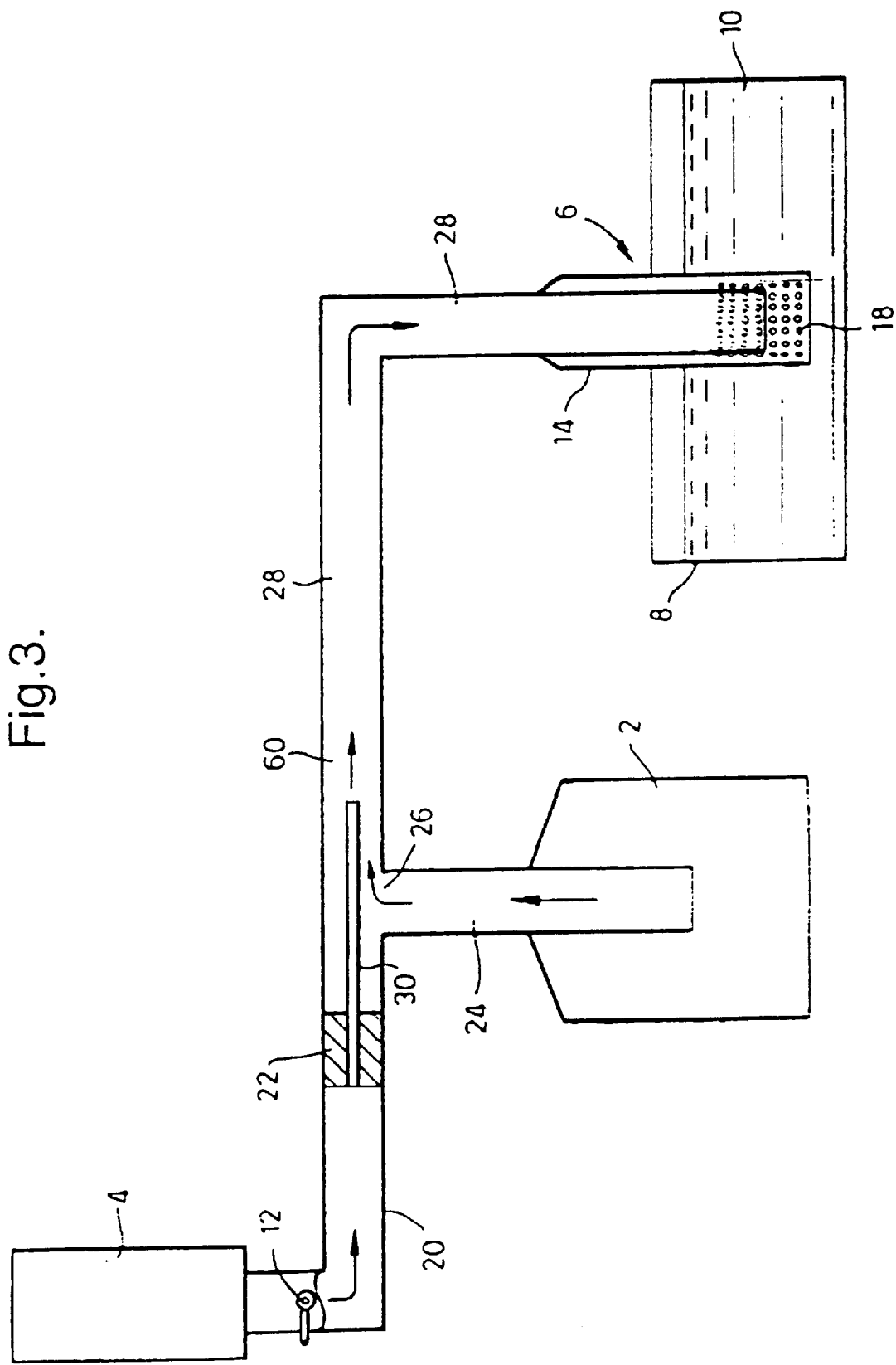
FIG. 3 is a schematic sectional side view of apparatus according to a second embodiment of the invention.

A schematic sectional side view of the first embodiment of apparatus in accordance with the present invention is shown in FIG. 1. The embodiment is sectioned along the longitudinal axis of a first passage 20 and a second passage 24. For clarity, the thin wall materials of the conduits forming these passages, as well as other elements of the apparatus, have been shown schematically as having no thickness.

This embodiment consists of a cooker hood 2, an air compressor 4, a filtering section 6, a control valve 12, a first passage 20, a fluid flow area control device 22 and a second passage 24 connected at a downstream portion of the first passage (i.e. a down stream passage).

In operation of this first embodiment the compressor 4, which may be a fan, pumps a first fluid (in this example, air) into the upstream, left hand end of the first passage 20. The amount of air passing through the first passage 20 is controllable by a control valve 12. Downstream of the valve 12 the pumped air passes through a fluid flow area control device 22, past a branch junction 26 where the second passage 24 branches into the first passage 20 and along the downstream portion 28 of the first passage before passing into the filter section 6 at the downstream end of the first passage 20.

The fluid flow area control device 22 in the first embodiment is a cylindrical plug with a small cylindrical aperture 23 provided along its central axis, coaxial with the longitudinal axis of the first passage 20, as shown in FIG. 2. As the pumped air enters into the opening of the aperture 23 in the upstream side of the plug 22 the air will accelerate due to the decrease in the available cross-sectional flow area of the aperture 23, relative to the cross-section of the first passage 20 upstream of the upstream side of the plug. Upon exiting the aperture 23 at the downstream side of the plug 22 and passing into the wider cross-sectional flow area of the first passage 20 in the region of the branch junction 26 adjacent the inlet formed by the second passage 24, the high velocity of the pumped first fluid (air) creates a low pressure region in the vicinity of the inlet of the second passage 24. In the illustrated embodiment the air pressure at the cooker hood will be approximately atmospheric pressure. The low pressure region thus draws a second fluid (in this example, cooking fumes largely comprising air) through the second passage 24 from the cooker hood 2. This drawn air then flows with the pumped air along the remainder of the first passage 20 to the filter section 6.

If the air in the cooker hood contains impurities such as smoke, air, steam or oil droplets, then these can be readily removed at the filter section 6. In this embodiment the filter section 6 has a tank 8 containing oil dissolving agents 10 into which the mixture of pumped and drawn air passes. In this way any oil droplets in the second fluid (air) can be removed. Other chemical or physical filters may be used instead of this tank or in addition to it. For instance, activated charcoal could be used to remove smoke and/or a desiccant could be used to remove water vapour. These other filters could be provided within the downstream portion 28 of the first passage or after the oil filter. The filters could be arranged in any effective order or in any suitable combination. The filters present could be matched to whatever impurities it is desired to remove from the incoming fluid.

The filter section is optional. If, for example, the mixture of pumped and drawn air was to be vented from downstream portion 28 direct to atmosphere, the filter section could be omitted.

By the time the air has passed through the filter section 6 it can be returned to the closed environment from which it came, for example a kitchen, or simply be expelled to atmosphere containing fewer impurities than if it had not been filtered.

In the illustrated embodiment of filter section 6, the end of the conduit forming the first passage 20 is surrounded by an outer pipe 14 of a greater diameter than the conduit. Holes 18 are provided in the perimeter of the lower end of this outer pipe which is in the tank and the air mixture passes through these into the oil dissolving agents. This arrangement reduces bubbling in the tank 8.

The small, central through-aperture 23 used in the fluid flow control element 22 has been found to be more effective than a simple gap between two halves of a fixed plug. The suction force generated at the downstream side of the flow control element 22 at branch junction 26 is greater for the same air pressure produced by the pump 4.

The diameter of the through-aperture 23 can be reduced to increase the suction at the inlet of the second passage 24. For a fixed first fluid flow rate, the smaller the size of the aperture 23, the greater will be the velocity of the first fluid when it exits the downstream side of the fluid flow area control device 22. In this illustrated embodiment the diameter of the aperture 23 is between 1 mm and 3 mm.

The entire portion of the first passage between the pump and the downstream side of the fluid flow area control device 22 can be provided with a constant cross-section that is reduced relative to the available flow cross-section downstream of said downstream side, so that the fluid flow area control device 22 simply acts to define an abrupt increase in the available cross-sectional flow area available to the first, pumped fluid at the downstream side of the device 22. However, this can lead to excessive resistance to the flow of the first fluid. Consequently, as in the illustrated embodiment, it is preferred for the fluid flow area control device 22 to be of restricted axial length, for example between about 20 mm and 100 mm. In this way the device 22 defines a reduction in the available cross-sectional flow area upstream of its upstream side as well as defining an abrupt increase in the flow area downstream of its downstream side.

In this illustrated embodiment the passage 20,24 are defined by conduits in the form of round pipes of between approximately 13–25 mm in diameter. The internal diameter of the conduit forming the first passage 20 matches the external diameter of the cylindrical plug 22.

The control valve 12 is preferably, as shown, present in the conduit forming the first passage 20 after the air compressor 4 but before the upstream side of the fluid flow control element 22. The valve 12 can be used to control the air pressure in the apparatus, for example if the bubbling action in the tank 18 becomes too great the air pressure may need to be reduced. Alternatively, the valve 12 can be useful if the suction of the second fluid (air) is too great and the air causes too much noise. The use of the control valve 12 may be in addition to, or as an alternative to, controlling the power supplied to the air compressor 4.

The length of the conduit forming the second passage 24 between the hood 2 and the first passage 20 can be chosen to suit individual usage. For most effective results this conduit is typically no more than 2000 mm long; beyond that the effectiveness of the apparatus reduces.

In the first illustrated embodiment the conduit forming the second passage 24 meets the conduit forming the first passage 20 at approximately right angles to form a branch junction. This centre of the branch junction may advantageously be positioned between about 0 mm and 100 mm downstream of the downstream side of the fluid flow area control device 22. In this way the main high velocity flow of pumped first fluid (air) flowing through the aperture 23 in the plug 22 does not disperse sufficiently to fill the whole of the expanded cross-sectional area of the first passage 20 by the time that the inlet of the second passage 24 is reached at the branch junction.

In FIG. 1 the downstream side of the plug 22 is shown as being spaced from the branch junction 26. The inlet for the second fluid, at which the first and second fluids are exposed to each other for the first time, is coincident with the branch junction 26 in this first embodiment. Consequently, the inlet is also spaced downstream of the downstream side of the plug 22.

A second embodiment of apparatus in accordance with the present invention is shown in FIG. 3. This embodiment is similar to that shown in FIG. 1, except for the provision of an extension pipe 30. In this second embodiment the effectiveness of the apparatus is increased, i.e. the suction generated in the second passage 24 is increased without requiring a corresponding increase in the air pressure supplied by the compressor 4. The extension pipe 30 has an internal diameter similar to that of the aperture 23 in the plug 22 and is connected directly to the downstream end face of the plug 22 with its opening aligned with the plug aperture 23. It has been found that good results are achieved when the length of the extension pipe 30 is about 200 mm, with the branch junction between the first and second passages 20, 24 being approximately midway along the axial length of the pipe 30, as shown in FIG. 3.

In this second embodiment the fluid flow area control device comprises both the apertured plug 22 and the extension pipe 30. The downstream side of the device, formed by the extreme right hand end of the pipe 30, is positioned downstream of the branch junction 26. In addition, the annular inlet 60 for the second fluid, at which the first and second fluids are exposed to each other for the first time, is also positioned downstream of the branch junction 26.

A third embodiment of apparatus is illustrated in FIGS. 4 and 5. The principle of operation of this third embodiment is similar to that of the previous embodiments. Where the same components exit in the third embodiment they have been given the same reference numbers as in the previous embodiments.

The difference between the third and first embodiments is in the form of the fluid flow control device 70. In the third embodiment this device comprises a solid, cylindrical plug positioned coaxially in the conduit forming the first passage 20. The diameter of the plug 70 is such that the plug's exterior surface is spaced from the surrounding cylindrical interior surface of the conduit to form therebetween a generally annular space through which the passage passes. In FIG. 5 the plug 70 is shown as being supported in the conduit by three radially extending supports 72. Other forms of support may be used. As with the first embodiment the plug 70 is of restricted axial length, for example between about 20 mm and 100 mm.

In FIG. 4 the downstream side of the plug 70 is shown as being spaced from the branch junction 26. The inlet for the second fluid, at which the first and second fluids are exposed to each other for the first time, is coincident with this branch junction 26. Consequently, in the third embodiment the inlet is also spaced downstream of the downstream side of the plug 70. The downstream side of the plug 70 may need not, however, be spaced from the branch junction 26 (not shown).

In the fourth embodiment illustrated in FIGS. 6 and 7, a similar system is used to that shown in FIGS. 1 and 2. Where the same components exist in the fourth embodiment they have been given the same reference numbers as those in the first embodiment.

In the fourth embodiment the differences are in the form of the fluid flow area control device and the inlet of the second passage 42. As can be seen in FIG. 4, the downstream end of a second passage 42 is formed by a second conduit 52 that meets and passes at an angle into a first conduit 62 forming the first passage 40 and continues coaxially within that first conduit 62. Thus the pumped air flowing within the first passage 40 must flow through a reduced cross-section annular passage 50 formed between the outside of the downstream portion of the second conduit 52 and the inside of the first conduit 62 as far as the end of the second conduit 52. At the extreme downstream end of the second conduit 52 the cross-sectional flow area available to the pumped first fluid increases abruptly.

In this fourth embodiment the downstream portion of the second conduit 52 acts as the fluid flow area control device, so that the available flow cross-section for the pumped fluid increases abruptly on exiting from the reduced cross-section annular passage 50. As in the previous embodiments, this increase in the flow cross-section available to the pumped fluid creates a region of reduced pressure at the downstream end of the fluid flow area control device, causing air from the cooker hood 2 to be drawn up along the second passage 42 into the first passage to then pass downstream with the pumped air, as in the earlier embodiments.

In this fourth embodiment the annular passage 50 around the extreme downstream (right hand) tip of the second conduit 52 forms the inlet for the second fluid, at which point the second fluid is exposed to the pumped, first fluid for the first time.

To give good efficiency, the annular passage 50 between the co-axial portion 44 of the second conduit 52 and the coaxial portion of the surrounding conduit 62 forming the first passage 40 is quite small and of constant cross-sectional area. Setting this radial gap "h" (see FIG. 7) to be between about 0.5 and 1.0 mm and making this co-axial region between about 20 mm and 100 mm long has been found to give particularly effective results. Excessive increases in the length of the reduced cross-section annular passage 50 reduce the overall efficiency of the apparatus.

The conduit 52 forming the second passage 42 branches into the conduit forming the first passage 40 in the fourth embodiment at an angle. This helps to improve the efficiency over the two conduits branching together perpendicularly. However, a perpendicular branch is possible.

The described and illustrated embodiments can be used with a variety of conduit or pipe sizes and shapes. The apparatus may be scaled up or down in size. Furthermore, the length of the different conduit portions can be changed. For example, the length of the conduit forming the second passage 24, or the length of the main part of the conduit forming the first passage 20 after the first and second conduits branch into one another can be varied. The diameter of the first conduit can, for example, be increased above the preferred 13–25 mm range mentioned earlier. The capacity of the air compressor 4 may need changing to match.

Although the conduits shown are pipes having circular cross-sections, conduits with other cross-sections are usable. Equally, the conduits do not need to be of constant cross-section or generally straight.

The illustrated and described embodiments are examples of the present invention being used with air as the pumped fluid and the drawn fluid. The apparatus is, however, operable with other gases or with liquids, for example water. When the apparatus is operated with water instead of air, the air compressor 4 can be replaced by a corresponding device, such as, for example, a water pump.

What is claimed is:

1. A fluid extraction apparatus comprising:
   a first passage;
   a fluid providing mechanism connected to an upstream side of the first passage and providing a first fluid to the first passage;
   a fluid flow area control device provided along the first passage and reducing a cross-sectional area of the first passage through which the first fluid passes;
   a downstream passage connected to the first passage downstream of the fluid flow area control device;
   a second passage connected to the downstream passage downstream of the fluid flow area control device, the second passage being distinct from the first passage upstream of the fluid flow area control device;
   whereby the pressure of the first fluid at a downstream side of the fluid flow area control device is reduced to bring a second fluid from the second passage into the downstream passage, the second fluid being separate from the first fluid in the first passage before the first fluid and the second fluid meet in the downstream passage.

2. The fluid extraction apparatus according to claim 1, wherein the at least one aperture comprises a single central aperture coaxially aligned with a longitudinal axis of the first conduit.

3. The fluid extraction apparatus according to claim 2, wherein a cross-sectional area of the aperture perpendicular to the longitudinal axis is substantially constant.

4. The fluid extraction apparatus according to claim 1, further comprising a filter section that is positioned at a downstream end of the downstream passage and purifies an incoming fluid from the downstream passage.

5. The fluid extraction apparatus according to claim 4, wherein the filter section comprises a tank containing oil dissolving agent in which the downstream passage is immersed so that the incoming fluid from the downstream passage passes through the oil dissolving agent.

6. The fluid extraction apparatus according to claim 4, further comprising a cooker hood connected to the second passage.

7. The fluid extraction apparatus according to claim 1, further comprising a control valve that is provided in the first passage and regulates an amount of the first fluid.

8. The fluid extraction apparatus according to claim 1, further comprising an extension pipe extending from the downstream end of the single central aperture in the plug to a downstream side of a junction connecting the second passage with the downstream passage.

9. The fluid extraction apparatus according to claim 8, wherein the junction is substantially at a center of a length of the extension pipe.

10. The fluid extraction apparatus according to claim 9, wherein the length of the extension pipe is between about two to about ten times of an axial length of the plug.

11. The fluid extraction apparatus according to claim 3, wherein when a diameter of the aperture is between x and 3x, the axial length of the plug is in the range of between 20x and 100x.

12. The fluid extraction apparatus according to claim 1, wherein the fluid flow area control device comprises a plug positioned so that a gap is provided between an exterior surface of the plug and an interior surface of the first conduit, the first fluid passing through the gap from the first passage to the downstream passage.

13. The fluid extraction apparatus according to claim 11, wherein the plug is coaxially aligned with a longitudinal axis of the first conduit.

14. The fluid extraction apparatus according to claim 1, wherein the second passage is connected to the downstream passage at substantially a right angle.

15. The fluid extraction apparatus according to claim 1, wherein the fluid flow area control device is arranged to provide an abrupt increase in the cross-sectional area of the first passage at the downstream side of the fluid flow area control device.

16. The fluid extraction apparatus according to claim 1, wherein the fluid providing mechanism is an air compressor.

17. A fluid extraction apparatus comprising:
a first conduit;
a fluid providing mechanism connected to an upstream side of the first conduit and providing a first fluid to the first conduit;
a second conduit that is inserted into the first conduit at an intermediate portion of the first conduit, an inserted portion of the second conduit being directed to a downstream side of the first conduit and being aligned with the first conduit so that a gap is provided between an exterior surface of the second conduit and an inner surface of the first conduit, the first fluid passing through the gap;
whereby a pressure of the first fluid at an end position of the second conduit in the first conduit is reduced to bring a second fluid from the second conduit into the first conduit, the second fluid being separate from the first fluid in the first conduit.

18. The fluid extraction apparatus according to claim 17, wherein a length of the inserted portion of the second conduit aligned with the first conduit is between 20 mm and 100 mm, and a width of the gap is between 0.5 mm and 1 mm.

19. The fluid extraction apparatus according to claim 17, wherein the inserted portion of the second conduit aligned with the first conduit is coaxial to the first conduit.

20. The fluid extraction apparatus according to claim 17, further comprising a filter section that is positioned at a downstream end of the first conduit and purifies a fluid from the first and second conduits.

21. The fluid extraction apparatus according to claim 20, wherein the filter section comprises a tank containing an oil dissolving agent in which the first conduit is immersed so that the fluid from the first and second conduits passes through the oil dissolving agent.

22. The fluid extraction apparatus according to claim 20, further comprising a cooker hood connected to the second conduit.

23. The fluid extraction apparatus according to claim 20, further comprising a control valve that is provided in the first passage upstream of a junction of the first and second conduits, wherein the control valve regulates an amount of the first fluid.

24. The fluid extraction apparatus according to claim 17, wherein the fluid providing mechanism is an air compressor.

25. The fluid extraction apparatus according to claim 1, wherein the fluid providing mechanism is a water pump.

26. The fluid extraction apparatus according to claim 17, wherein the fluid providing mechanism is a water pump.

27. A fluid extraction apparatus comprising:
a first passage;
a fluid providing mechanism connected to an upstream side of the first passage and providing a first fluid to the first passage;
a fluid flow area control device provided along the first passage and reducing a cross-sectional area of the first passage through which the first fluid passes;
a downstream passage connected to the first passage downstream of the fluid flow area control device;
a second passage connected to the downstream passage downstream of the fluid flow area control device, the second passage being distinct from the first passage upstream of the fluid flow area control device;
whereby the pressure of the first fluid at a downstream side of the fluid flow area control device is reduced to bring a second fluid from the second passage into the downstream passage, the second fluid being separate from the first fluid in the first passage before the first fluid and the second fluid meet in the downstream passage,
wherein the cross section of the first conduit is substantially constant,
wherein the second conduit extends outwardly from the peripheral surface of the first conduit, and
wherein all of the fluid in the first conduit passes through the fluid flow control device.

* * * * *